(12) United States Patent
Tang et al.

(10) Patent No.: US 12,330,403 B2
(45) Date of Patent: Jun. 17, 2025

(54) PLANK WITH ANTI-SLIP FUNCTION AND PREPARATION METHOD THEREOF

(71) Applicant: ANHUI SENTAI WPC GROUP SHARE CO., LTD., Guangde (CN)

(72) Inventors: Daoyuan Tang, Guangde (CN); Guangrong Wu, Guangde (CN); Mengde Deng, Guangde (CN)

(73) Assignee: ANHUI SENTAI WPC GROUP SHARE CO., LTD. [CN/CN], Guangde (CN)

( * ) Notice: Subject to any disclaimer, the term of this patent is extended or adjusted under 35 U.S.C. 154(b) by 0 days.

(21) Appl. No.: 17/617,775

(22) PCT Filed: Oct. 31, 2021

(86) PCT No.: PCT/CN2021/127798
§ 371 (c)(1),
(2) Date: Dec. 9, 2021

(87) PCT Pub. No.: WO2023/070641
PCT Pub. Date: May 4, 2023

(65) Prior Publication Data
US 2024/0157688 A1    May 16, 2024

(51) Int. Cl.
*B32B 27/12* (2006.01)
*B29C 37/00* (2006.01)
(Continued)

(52) U.S. Cl.
CPC .......... *B32B 27/12* (2013.01); *B29C 37/0078* (2013.01); *B29C 37/0082* (2013.01);
(Continued)

(58) Field of Classification Search
CPC ............ B29C 37/0078; B29C 37/0082; B29C 37/0085; B29C 44/1271; B29C 48/0012;
(Continued)

(56) References Cited

U.S. PATENT DOCUMENTS 2,437,855 A * 3/1948 Leach, Jr. ........... B29C 37/0032
264/255
2,948,651 A * 8/1960 Waag .................. B29C 44/1209
428/95

(Continued)

FOREIGN PATENT DOCUMENTS

CN    113043704 A * 6/2021 ............. B29C 39/10

OTHER PUBLICATIONS

Machine translation of CN 113043704. Obtained from EPO. (Year: 2021).*

*Primary Examiner* — Jeffrey M Wollschlager
(74) *Attorney, Agent, or Firm* — Olive Law Group, PLLC

(57) ABSTRACT

The present disclosure relates to a plank with anti-slip function and a method preparing the same; it belongs to the technical field of plank manufacturing. The plank with anti-slip function includes a support body and an anti-slip body clamped on the support body; the anti-slip body has a clamping member; the support body is provided with a plurality of clamping grooves that cooperate with the clamping member; the clamping groove is provided with at least one limiting part that restricts the clamping member from escaping from the clamping groove; the support body is made of thermoplastic material, and the anti-slip body is made of elastomer material. In the present disclosure, by replacing the material of the support body with thermoplastic polyolefin, the cost of the support body is significantly reduced, and the strength is improved; the present disclosure will also provide a matching structure between the support body and the anti-slip body to make the anti-slip body firmly clamped on the support body, so that the present disclosure simultaneously exerts the advantages of the thermoplastic support body and the elastic anti-slip body, thereby the plank (Continued)

has the advantages of high compressive strength and good surface contact.

3 Claims, 5 Drawing Sheets

(51) Int. Cl.
| | |
|---|---|
| B29C 43/18 | (2006.01) |
| B29C 44/12 | (2006.01) |
| B29C 48/00 | (2019.01) |
| B29C 48/15 | (2019.01) |
| B29C 48/16 | (2019.01) |
| B29C 48/255 | (2019.01) |
| B29C 48/50 | (2019.01) |
| B29K 27/06 | (2006.01) |
| B29K 55/02 | (2006.01) |
| B29K 75/00 | (2006.01) |
| B29K 105/04 | (2006.01) |
| B32B 3/04 | (2006.01) |
| B32B 3/30 | (2006.01) |
| B32B 5/02 | (2006.01) |
| B32B 5/18 | (2006.01) |
| B32B 5/24 | (2006.01) |
| B32B 27/30 | (2006.01) |
| B32B 27/40 | (2006.01) |
| B29K 105/08 | (2006.01) |
| B29K 309/08 | (2006.01) |

(52) U.S. Cl.
CPC ...... *B29C 37/0085* (2013.01); *B29C 44/1271* (2013.01); *B29C 48/0012* (2019.02); *B29C 48/15* (2019.02); *B29C 48/16* (2019.02); *B29C 48/255* (2019.02); *B29C 48/501* (2019.02); *B32B 3/04* (2013.01); *B32B 3/30* (2013.01); *B32B 5/024* (2013.01); *B32B 5/18* (2013.01); *B32B 5/245* (2013.01); *B32B 27/302* (2013.01); *B32B 27/40* (2013.01); *B29C 2043/181* (2013.01); *B29K 2027/06* (2013.01); *B29K 2055/02* (2013.01); *B29K 2075/00* (2013.01); *B29K 2105/04* (2013.01); *B29K 2105/0845* (2013.01); *B29K 2309/08* (2013.01); *B29K 2995/0072* (2013.01); *B32B 2262/101* (2013.01); *B32B 2266/0235* (2013.01); *B32B 2307/308* (2013.01); *B32B 2307/7376* (2023.05); *B32B 2307/744* (2013.01); *B32B 2607/00* (2013.01)

(58) Field of Classification Search
CPC ....... B29C 48/15; B29C 48/16; B29C 48/255; B29C 48/501; B29C 2043/181; B29C 44/06; B29C 44/50; B29C 37/0028; B29C 37/0032; B29C 2037/0035; B29C 45/1657; B29C 2045/166; B32B 27/12; B32B 3/04; B32B 3/30; B32B 5/024; B32B 5/18; B32B 5/245; B32B 27/302; B32B 27/40; B32B 2262/101; B32B 2266/0235; B32B 2307/308; B32B 2307/7376; B32B 2307/744; B32B 2607/00; B32B 5/02; B32B 7/06; B32B 15/02; B32B 15/046; B32B 15/18; B32B 21/047; B32B 21/14; B32B 17/02; B29K 2027/06; B29K 2055/02; B29K 2075/00; B29K 2105/04; B29K 2105/0845; B29K 2309/08; B29K 2995/0072; B29K 2995/0073; B29K 2995/0074; B29L 2007/002; C08G 2110/0025; C08G 18/48; C08J 2201/03; C08J 2327/06; C08J 9/103; C08J 5/18; C08J 9/0023; C08J 9/0066; C08J 9/0095; C08J 2203/04; C08J 2375/08; E04F 15/02172; E04F 15/105; E04F 15/107; E04F 15/02; E04F 15/02183; E04F 15/22; C08K 2003/265; C08K 3/34; C09D 127/06; B29D 7/00
See application file for complete search history.

(56) References Cited

U.S. PATENT DOCUMENTS

| | | | | |
|---|---|---|---|---|
| 4,084,030 | A * | 4/1978 | Goodale | C08J 9/34 |
| | | | | 428/141 |
| 4,794,027 | A * | 12/1988 | Hering | B32B 3/26 |
| | | | | 428/218 |
| 5,399,393 | A * | 3/1995 | Zoller | B29C 39/10 |
| | | | | 52/716.5 |
| 2003/0228817 | A1* | 12/2003 | Vito | F16F 1/3605 |
| | | | | 442/260 |
| 2005/0281980 | A1* | 12/2005 | Cruz | B32B 3/266 |
| | | | | 264/510 |
| 2007/0078253 | A1* | 4/2007 | Ulbrich | C08G 18/10 |
| | | | | 264/255 |
| 2014/0199551 | A1* | 7/2014 | Lewit | C09D 163/10 |
| | | | | 523/400 |
| 2019/0168468 | A1* | 6/2019 | Matsumoto | B32B 27/36 |
| 2019/0184365 | A1* | 6/2019 | Gleason | C08L 33/14 |
| 2019/0291315 | A1* | 9/2019 | Neff | B29C 45/14311 |
| 2023/0182437 | A1* | 6/2023 | Long | B32B 5/18 |
| | | | | 428/158 |

* cited by examiner

PLANK WITH ANTI-SLIP FUNCTION AND PREPARATION METHOD THEREOF

TECHNICAL FIELD

The present disclosure relates to a plank, and in particular, to a plank with anti-slip function and a preparation method thereof. It belongs to the technical field of plank manufacturing.

BACKGROUND

Elastomers such as natural rubber, synthetic rubber and thermoplastic elastomers all have a good touch, and are soft and elastic. These characteristics make the plank with elastomer material surface have incomparable advantages in decoration compared with other materials, especially for indoor or outdoor floors.

The patent document with the granted publication No. GB2445714B discloses a plank. The plank has an elastic surface and a rigid foamed core as a support beam. Its surface layer and core are made of polyurethane, so the surface layer and core can be fused to form a whole without the use of releasable attachment means. Since polyurethane is used as the core to be made by a foaming process, the strength of the thermosetting polyurethane material as a support beam after foaming cannot fully meet the various strength requirements of the plank in the application scenarios, so its polyurethane core is mixed with a certain amount of fiber to enhance the strength of the overall core. Due to the surface elasticity of the plank, and the core is reinforced by fibers, and the two layers have a good bonding force due to the same material, the plank has good touch and strength, and are widely welcomed by the market.

However, the material cost of the polyurethane plank is high, the process of mixing fiber reinforcement in the manufacture of the core is very complicated, and the improvement of the equipment is involved, such that it is difficult for the plank to be widely promoted and applied.

SUMMARY

Embodiments of the present disclosure provide a plank with anti-slip function, intending to solve the above-mentioned problems. By replacing the core material, the plank of the present disclosure not only achieves a significant reduction in material cost, but also enables it to meet the strength requirements of a fiber-reinforced polyurethane plank without using fiber reinforcement.

The technical solutions of the present disclosure to solve the above-mentioned problems are as follows:

A plank with anti-slip function comprises a hard support body and an anti-slip body clipped on the support body in a releasable manner;

the anti-slip body has a planar body forming a use surface of the plank, and the planar body extends in a direction of the support body to form a clamping member;

the support body is provided with a plurality of clamping grooves that cooperate with and are able to be releasable from the clamping member; the clamping groove is provided with at least one limiting part that restricts the clamping member from escaping from the clamping groove in a reverse direction that the clamping member extends toward the clamping groove;

the support body comprises a core and a plurality of shaping parts provided in the core to prevent the core from deforming; the core is a cubic structure with at least eight edge corners; the plurality of shaping parts are connected to at least three of the eight edge corners at the same time;

the core of the support body is made of thermoplastic material, and the anti-slip body is made of elastomer material.

In the prior art, the material of the elastic surface layer may be polyurethane, and the material of the hard core layer may be rigid foamed polyurethane. Since the surface layer and the core layer are both polyurethane, the surface layer and the core layer can be combined by heat fusion without a need of releasable attachment means. However, because the strength of rigid foamed polyurethane is not high enough, the prior art adopts the method of adding fibers to the polyurethane, intending to solve the problem of insufficient strength of the polyurethane itself and achieve good technical effects. However, the cost of polyurethane materials is high, and when the polyurethane is extruded, the fiber will often block the extrusion port of the mold or the like, causing the high manufacturing cost of the fiber-reinforced core layer. First of all, the inventor hopes to solve the problem of high cost by replacing the material, and at the same time, it does not use fiber reinforcement to prevent the blocking of the mold. However, it is almost impossible to find a material that is more suitable for anti-slip function than polyurethane. The inventor imagines whether the core and the anti-slip layer can be made of different materials, namely the anti-slip body is still made of elastic polyurethane elastic material, while the core is made of other cheap materials. This core material does not adopt fiber reinforcement, but should be strong enough. Obviously there are many such materials, such as various thermoplastic materials. However, this brings about the problem of how to connect two different materials, especially the plank needs to be kept for a long time without deformation or cracking under the multiple factors of water, air and sunlight, especially if one material is hard, one is soft, and the peeling force between them is relatively large when it plays the anti-slip effect. The inventor solves the above problems through a firm-fitting structure and innovative technology, that is, a large number of clamp structures are provided on the contact surface between them to achieve the strength of the bonding force. Namely, the rigid support body is slotted first, and then the anti-slip body is clipped and shaped into the groove to realize a releasable and strong connection.

However, the inventor has found in a large number of experiments that although thermoplastic materials can meet the strength requirements, due to their thermoplastic characteristics, in actual use, the shape and size of the support body will shrink in harsh environments such as heat and water, this will not only cause the support body and the anti-slip body to released from each other, but in many cases may lead to the disintegration of the plank. In order to solve this problem, the inventor tried to install a shaping part in the core to keep the size of the support body and prevent its deformation. However, the material, shape and setting position of the shaping part are the key to whether the size of the support body can be truly kept. The inventor found through a large number of experiments that since the support body is plate-shaped, it usually has eight corners, and only three edge corners of the support body need to be kept to effectively reduce the shrinkage of the support body as a whole after undergoing heat. Next, how to manufacture the structure with low cost and high efficiency is still a difficult problem.

The so-called the shaping part connected to the edge corner refers to the shortest distance between the edge of the shaping part and the corner vertex of the support body is not more than 25% of the width of the support body, such that it is enough to prevent the size of the thermoplastic material of the support body from shrinking when heated. If it is not connected or the distance is too large, it will directly cause the size of the edge corners of the support body to shrink, thereby causing the size of the overall plank to shrink.

Among many high molecular polymer materials, the material strength of thermosetting polyurethane is at a relatively low level, and fibers are needed to increase its strength. Thermoplastic materials not only have higher material strength, but also have cost advantages, such that it is an ideal choice.

The thermoplastic material can be a variety of polyolefins that meet the strength requirements, such as polyethylene, polypropylene, and ethylene propylene copolymer. Alternatively, it can also be a homopolymer of an olefin containing polar groups, such as polyvinyl chloride. Alternatively, it can also be modified polyolefins, such as modified unsaturated carboxylic acids. The modified form of unsaturated carboxylic acid can be blending, copolymerization and grafting. Blending refers to mixing a polymer obtained by polymerization of unsaturated carboxylic acids with polyolefins, such as a mixture of polyacrylic acid and polyethylene. Copolymerization refers to adding unsaturated carboxylic acids during the synthesis of polyolefin resins, to obtain copolymers of olefin monomers and unsaturated carboxylic acid monomers, such as polymers with repeating units of "-ethylene-acrylic acid-ethylene-". Grafting means that after the synthesis of the polyolefin resin is completed, the polymer chain undergoes a grafting reaction to add a side chain structure to the polymer chain, so that the polymer obtains additional groups, such as maleic anhydride grafted polyethylene.

Since thermoplastics have higher Shore hardness and elastic modulus than thermoplastic elastomers, the replacement of rigid foamed polyurethane with thermoplastics can significantly increase the strength of the plank without using fiber reinforcement. Based on the above description, high strength has two meanings. On the one hand, it refers to a better performance to resist the collapse of the plate caused by heavy pressure. On the other hand, it refers to a better performance to resist the elastic deformation of the plate caused by heavy pressure.

The inventor sets a matching structure between the support body and the anti-slip body, so that the support body and the anti-slip body are combined based on the matching structure. As described above, the matching structure includes a clamping member formed by the anti-slip body extending in the direction of the support body, and a plurality of clamping grooves on the support body that cooperate with the clamping member. In addition, at least one limiting part is provided in the clamping groove, so that the clamping member can be restricted in the clamping groove and is difficult to escape from the support body. However, the clamping member can still move along the opening direction of the clamping groove in the clamping groove, or even detach from the clamping groove. Sometimes when the anti-slip body on the surface is damaged or the clamping between the anti-slip body and the support body becomes loose, the anti-slip body can be released by extending the direction of the clamping groove and then the connection between them can be repaired or the anti-slip body can be replaced.

Generally, the contact surface of the support body and the anti-slip body is a flat surface. In order to further improve the combination of the support body and the anti-slip body. In one embodiment, the contact surface of the support body and the anti-slip body is a surface with a sawtooth cross section.

In one embodiment, the shaping part comprises a frame for preventing the core of the support body from shrinking when heated, and a connecting body covering the frame and configured for connecting the frame and the core of the support body; the shaping part has a thickness of 0.5~5.0 mm.

In the prior art, since the support body is rigid foamed polyurethane, it is thermosetting, so even when heated, its size will still hardly change. The present disclosure replaces the support body with a thermoplastic material. Thermoplastic materials undergo dimensional changes when heated. It is expected that after the floor is paved, especially when the outdoor floor is exposed to violent sunlight in summer, the floor will shrink irreversibly due to the increase in temperature. This causes cracks between adjacent floors, especially at the corners, generating cavities and exposing the ground below the floor, resulting in seriously affecting the appearance and even damaging the connection between the floor and the keel.

The shaping part in the above-mentioned technical solution of the present disclosure is provided to solve the above-mentioned problems. After the setting of the shaping part, the above-mentioned problems of the present disclosure have been effectively solved. Experimental studies have shown that after the addition of shaping parts, the thermal shrinkage rate of the support body is reduced from more than 2.0% to about 0.005%; the linear expansion coefficient is reduced from $4.35*10^{-5}$ to $2.66*10^{-5}$; significant effects have been achieved. Specifically, the support body is a cubic structure with at least eight edge corners, and the shaping parts are connected to at least three of the eight edge corners at the same time. This enables the shaping part to strengthen the support body, so that the support body does not shrink due to heat, because this shrink force is offset by the support force of the shaping part. Moreover, the resin of the shaping part and the thermoplastic material of the support body can produce good fusion, so that the shaping part can be combined with the support body, making the shaping part exert a better technical effect of resisting heat shrinkage.

In one embodiment, the support body further comprises a reinforced shell wrapped around the core of the support body, the reinforced shell is connected to the core without a peelable manner; the reinforced shell has a thickness of 1.0~10.0 mm.

The resin of the shaping part is adhesive, especially when heated, the adhesiveness is better. Therefore, the shaping part can also be combined with the above-mentioned reinforced shell, so that the shaping part can also prevent the shrinkage of the reinforced shell when heated.

In one embodiment, the frame is thread or a net or cloth formed of threads, and the threads are one of inorganic non-metal threads, metal threads, polymer threads or a mixed thread formed by at least two thereof.

In one embodiment, the connecting body is a solid resin at room temperature. Further, the resin is general-purpose plastic or engineering plastic. Furthermore, the resin is one or more selected from a group consisting of PE, PP, PVC, PS, ABS, ASA, PA, PC, POM, PBT, PPO, PETG, PAR, POB, PHB, PASF, PI, PEI, PEK, PEEK.

In one embodiment, the frame is a mesh belt-shaped part made of continuous glass filaments, and the connecting body is ABS resin.

In one embodiment, each of the shaping parts is in a shape of a belt, two shaping parts are provided, and are respectively connected to at least three corners of two sides of the support body.

The present disclosure is also intended to provide a method for preparing the plank with anti-slip function above, comprising the following steps:
- a, pouring a liquid raw material of the elastomer into a mold;
- b, preparing and placing the support body into the mold with the clamping groove facing downward, so that the support body floats or is suspended in the liquid raw material;
- c, applying a pressure to the support body to sink in the liquid raw material, so that the liquid raw material enters the clamping groove of the support body;
- d, clamping the mold and maintaining the pressure to solidify the liquid raw material.

In one embodiment, the support body can be prepared by the following steps:
1), inputting a first raw material containing a first resin and a foaming agent into a main extruder after fully mixed, and extruding, by the main extruder, the first raw material into a main runner of a co-extrusion die, to form a pressure-retaining core;
2), inputting two shaping parts with belt shape from two side runners of the co-extrusion die respectively;
3), feeding, by an auxiliary extruder, a second raw material containing a second resin from the co-extrusion runner of the co-extrusion die, and extruding from an outlet of the die to obtain a reinforced shell with a frame shape;
4), extruding the pressure-retaining core, the shaping parts and the reinforced shell from their respective runners, to form a mold blank;
5), inputting the mold blank into a shaping mold; and foaming, in the shaping mold, the pressure-retaining core in the reinforced shell constrained by inner walls of the shaping mold, to fill the reinforced shell to form a support body precursor;
6), opening the clamping grooves on at least one surface of the support body precursor;

where, the main runner, the side runners and co-extrusion runner are provided independently of one another;

the pressure-retaining core is provided in the reinforced shell, and the shaping parts with belt shape are provided between two opposite surfaces of the pressure-retaining core and the reinforced shell; and a pre-formed foaming space is provided between the pressure-retaining core and the reinforced shell.

In the above technical solution of the present disclosure, the foaming agent includes both a chemical foaming agent, such as being added to the first resin raw material in the form of a material; and a physical foaming agent, such as being not added to the raw material, but is inputted by the supercritical carbon dioxide fluid, to mix with the first resin inside the extruder.

Based on the prior art, it is easy to implement a reinforced shell on the support body. However, it becomes very difficult to provide the aforementioned shaping part between the reinforced shell and the support body.

According to a general understanding, a side runner for inputting the shaping part is opened on the co-extrusion die, then the side runner and the main runner are merged, and then the co-extrusion is carried out to cover the reinforced shell, and finally extruded from the die orifice/outlet. The inventor has used such a scheme for experimental research, but encountered the same problem every time. The problem is that the side runner is always blocked, and the support body is not foamed uniformly, making it difficult to achieve the desired effect. After analyzing the above problems, the inventor believes that there is a large pressure inside the main runner. Once the runner of the shaping part is communicated to the main runner, the pressure in the main runner will be released in the reverse direction along the flow path of the shaping part, and naturally the material is extruded into the flow path of the shaping part and further foams, thereby blocking the flow path of the shaping part. Once the above problems occur, on the one hand, the input of the shaping parts becomes difficult and production is interrupted; on the other hand, the support body produced before the runner of the shaping parts is blocked makes the materials cannot be evenly distributed in the main runner, due to the loss of part of the material and the premature pressure release. There are often more materials in the middle of the support body but less materials on both sides. The above conditions will make the foaming of the support body become uneven. For example, the density in the middle area is higher and the density on both sides is lower. This is disadvantageous for providing the physical strength of the support body.

In the above-mentioned technical scheme of the present disclosure, the above-mentioned problems are settled by changing the production method and reforming the mold, mainly manifesting in the following aspects:

in terms of the mold,
1, the main runner is designed to maintain pressure in the entire mold;
2, the co-extrusion runner is added;
3, the the shaping part runner, the co-extrusion runner and the main runner are independent of one another, and merged in the port of the mold discharge plate;
4, the mold outlet is installed with a shaping mold;

in terms of method, the previous idea of forming a composite plank from the mold exit is abandoned, and a co-extruded shell is introduced to make the materials merge at the mold exit, although compounding is not realized, but the automatic assembly of blanks required for compounding is realized, and then enter the shaping mold for compounding. The shaping mold provides two functions, helping the mold blank to be formed and realizing the shaping of the plank.

In one embodiment, the shaping part is prepared by the following steps:
S1, inputting the mesh cloth made of continuous glass threads from a sealing end of a second mold into the second mold, and then pulling them out from an outlet of the second mold to maintain the mesh cloth in a stretched state;
S2, melting and extruding the resin with an extruder, and entering the main runner of the second mold from the material inlet provided on a side of the second mold; making the molten resin meet the mesh cloth in a stretched state in the main runner; then, extruding the resin and the mesh cloth from the outlet of the second mold, such that the shaping part is prepared.

In one embodiment, the mold for making the shaping part is as follows:

In the second mold, one end of the main runner is the mold orifice, and the other end is sealed, and the inlet of the mold is provided on the side of the mold. The sealing end of the mold is provided with a harness part that allows mesh cloth to pass in and restricts the flow of molten resin in the main runner.

In a further embodiment, the harness part has two ends, one end is a tip, and is arranged in the cavity of the second mold; the other end is a tail end, and is arranged on the end cap at the sealing end of the second mold. Between the tip and the tail ends is formed with a thread channel allowing mesh cloth to pass through.

In one embodiment, the co-extrusion die comprises a main mold and a shaping mold;
- the main mold is formed by butting a plurality of mold plates including a mold feed plate, a runner forming plate, and a mold discharge plate;
- the main mold is provided with the main runner, the shaping part runner and the co-extrusion runner; the main runner, the shaping part runner and the co-extrusion runner are independent of one another in the main mold;
- the shaping part runner comprises a first channel and a second channel distributed on both sides of the main runner; the first channel and the second channel are formed as a first discharge port and a second discharge port on both sides of a main runner discharge port on the mold discharge plate;
- the co-extrusion runner forms a surface discharge port on the mold discharge plate, the surface discharge port has a rectangular ring structure and is sleeved around the main runner discharge port, and the first discharge port and the second discharge port are provided between the main runner discharge port and the surface discharge port.

In summary, the present disclosure has the following beneficial effects:
1. In the present disclosure, by replacing the material of the support body with thermoplastic polyolefin, the cost of the support body is significantly reduced compared with the prior art, and the strength is improved;
2. In the present disclosure, after replacing the material of the support body with thermoplastic polyolefin, a matching structure is provided between the support body and the anti-slip body, so that the anti-slip body is firmly clamped on the support body, making the present disclosure simultaneously exert the advantages of the thermoplastic support body and the elastic anti-slip body, so that the plank has the advantages of high compressive strength and good surface contact;
3. The present disclosure significantly improves the ability of the plank to resist thermal shrinkage by providing the shaping parts inside the support body;
4. The present disclosure provides a method for combining a support body and an anti-slip body, based on this method, the anti-slip body can better cover the support body;
5. The present disclosure also provides a method for implanting the shaping part inside the support body, aiming to solves the problem of implanting continuous belt-shaped materials inside the support body.

It is understandable that both the foregoing general description and the following detailed description are exemplary only, and are not intended to limit the present disclosure.

BRIEF DESCRIPTION OF DRAWINGS

The drawings herein are incorporated in and constitute a part of this specification of the present disclosure, showing embodiments consistent with the present disclosure, and explaining the principles of the present disclosure together with the description.

Figure 1:
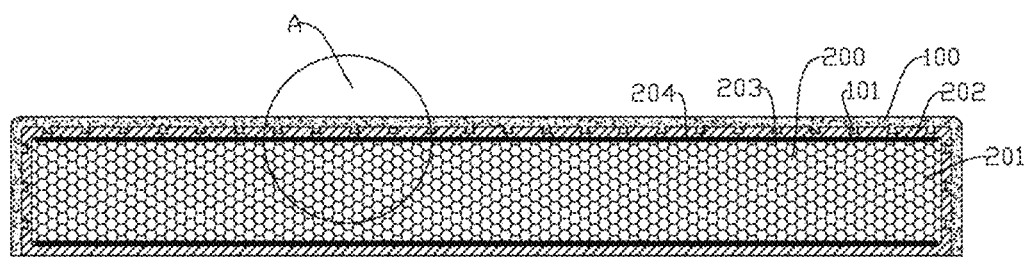
FIG. 1 is a schematic structural diagram illustrating Example 1 of the present disclosure.

In the figures:
10—main runner, 20—shaping part runner, 21—first channel, 22—second channel, 30—co-extrusion runner, 31—surface discharge port; 50—inlet of the second mold, 60—harness part; 100—anti-slip body, 101—clamping member, 200—support body, 201—core, 202—reinforced shell, 203—clamping groove, 204—shaping part, 211—first discharge port, 221—second discharge port; 2031—limiting part.

DESCRIPTION OF EMBODIMENTS

The present disclosure will be described in further detail with reference to the drawings, to clearly present the objects, technical solutions, and advantages of the present disclosure.

Exemplary embodiments will now be described more fully with reference to the enclosed drawings. However, the exemplary embodiments can be implemented in various forms, and should not be construed as being limited to the embodiments set forth herein; on the contrary, these embodiments are provided so that the present disclosure can be comprehensive and complete, and the concept of the exemplary embodiments can be fully conveyed to those skilled in the art. The same reference numerals in the figures indicate the same or similar structures, and thus their detailed descriptions will be omitted. In addition, the drawings are only schematic illustrations of the present disclosure, and are not necessarily drawn to scale.

Although relative terms such as "upper" and "lower" are used in this specification to describe the relative relationship between one component and another component of an assembly, these terms are used in this specification only for convenience, for example, the direction of the example shown in the drawings. It can be understood that if the part of the assembly is turned upside down, the described "upper" components will become the "lower" components. When a structure is "on" an other structure, it may mean that a certain structure is integrally formed on an other structure, or that a certain structure is "directly" installed on an other structure, or that a certain structure is "indirectly" installed on an other structure through another structure.

The terms "a", "an", "the", "said" and "at least one" are used to indicate the presence of one or more elements/components/etc. The terms "include" and "included" are used to indicate open-ended inclusion and mean that in addition to the listed elements/components/parts/etc., there may be other elements/components/parts/etc. The terms "first" and "second" etc. are only used as marks, instead to limit the number of its objects.

Example 1 (Exp. 1)

Figure 2:
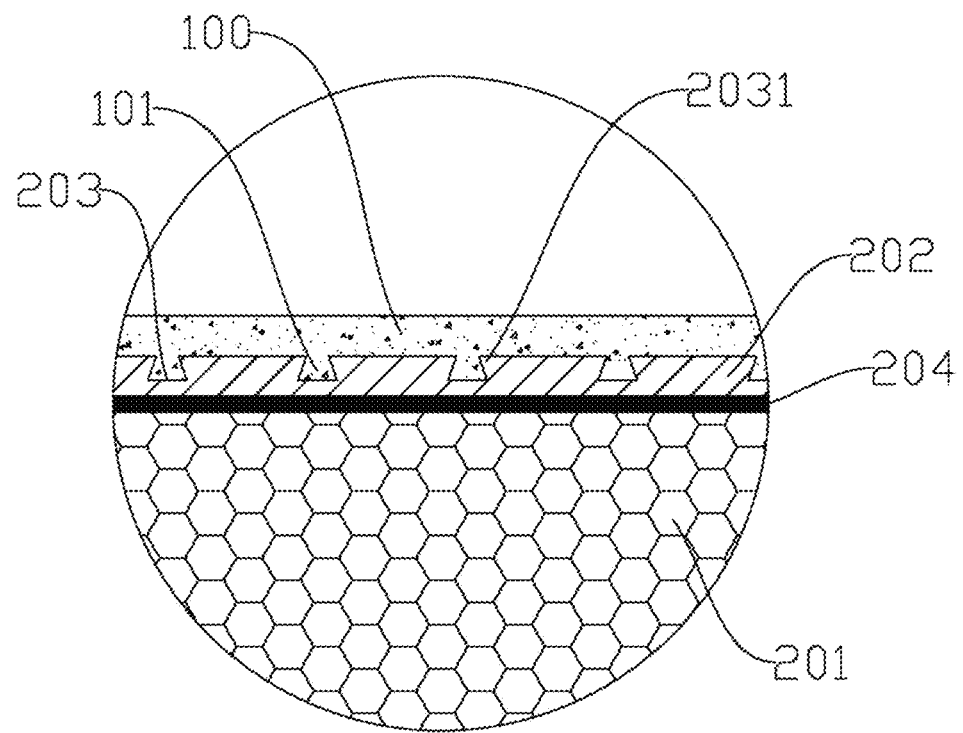
FIG. 2 is an enlarged view of area A in FIG. 1.

As shown in FIGS. 1 to 2, a plank with anti-slip function may include a hard support body 200 and an anti-slip body 100 clamped on the surface of the support body 200.

The anti-slip body 100 may have a planar body forming the use surface of the plank, and the planar body extends toward the support body 200 to form a clamping member 101.

The support body 200 may have a plurality of clamping grooves 203 that cooperate with the clamping member 101; the clamping groove 203 may have two limiting parts 2031 for restricting the clamping member 101 from escaping from the clamping groove 203 in a direction away from the support body. The clamping groove 203 is opened parallel to the longitudinal direction of the plank into a long belt shape, and the clamping member 101 is opened parallel to the length direction of the plank into a long belt, both of which can be completely released along the opening direction.

The support body 200 may include a core 201, two shaping parts 204 provided in the core to prevent the core 201 from deforming, and a reinforced shell 202 wrapped around and integrally connected with the core 201. The reinforced shell 202 may have a thickness 4.0 mm.

The core 201 may have a cubic structure with an upper and lower surfaces, and both the upper and lower surfaces have four edge corners respectively.

Each of the two shaping parts 204 may be in a belt shape; one may be connected to the four edge corners of the upper surface of the support body 201, and the other may be connected to the four edge corners of the lower surface of the support body 201.

The shaping part 204 may include a frame for preventing the core 201 from shrinking when heated, and a connecting body that covers the frame and used to connect the frame and the support body; the thickness of the shaping part may be 2.0 mm.

The frame may be a mesh cloth woven from continuous glass filaments, and the connecting body may be ABS resin.

The core 201 may be made of thermoplastic material PVC through foaming, and the anti-slip body 201 may be made of elastomer material PU.

The method for preparing the above-mentioned plank with anti-slip function may include the following steps:
a, pouring a liquid raw material for forming the anti-slip body 100 into a mold; the liquid raw materials may be formed of the following materials: 2200 g of polyether polyol, 15 g of talc, 600 g of isocyanate, and 4 g of curing agent;
b, preparing and placing the support body into the mold with the clamping groove facing downward, so that the support body floats or is suspended in the liquid raw material;
c, applying a pressure to the support body to sink in the liquid raw material, so that the liquid raw material enters the clamping groove of the support body;
d, clamping the mold and maintaining the pressure to solidify the liquid raw material.

The method for preparing the above-mentioned support body may be as follows:
1), mixing 100 kg of PVC resin, 50 kg of calcium carbonate, 10 kg of acrylic regulator, 5 kg of calcium zinc stabilizer, and 1 kg of AC foaming agent in a high-speed mixer for 15 minutes, with a mixing temperature of 120° C., and then cooling in a cold mixer to 30° C.; and then inputting to the main extruder to be extruded from the main runner by the main extruder to form a pressure-retaining core;
2), inputting the two shaping parts 204 respectively from the two shaping part runners located on the two sides of the co-extrusion die;
3), mixing 100 kg of PVC resin, 50 kg of calcium carbonate, 0.5 kg of stearic acid and 5 kg of calcium zinc stabilizer in the high-speed mixer for 15 minutes at a mixing temperature of 120° C., and then cooling in the cold mixer to cool to 30° C.; and then feeding from the co-extrusion runner of the co-extrusion die through an auxiliary extruder, and extruding from the outlet of the co-extrusion die to obtain a reinforced shell 202 with a frame shape in cross section;
4), extruding the pressure-retaining core, the shaping parts 204 and the reinforced shell 202 from their respective runners, to form a mold blank;
5), inputting the mold blank into a shaping mold; and foaming, in the shaping mold, the pressure-retaining core in the reinforced shell constrained by inner walls of the shaping mold, to fill the reinforced shell to form a support body precursor;
6), opening the clamping grooves 203 on at least one surface of the support body precursor;

The pressure-retaining core may be provided in the reinforced shell 202, and the belt-shaped shaping part 204 may be provided between the two opposite surfaces of the pressure-retaining core body and the reinforced shell body; and a pre-formed foaming space can be provided between the pressure-retaining core and the reinforced shell 202.

Figure 3:
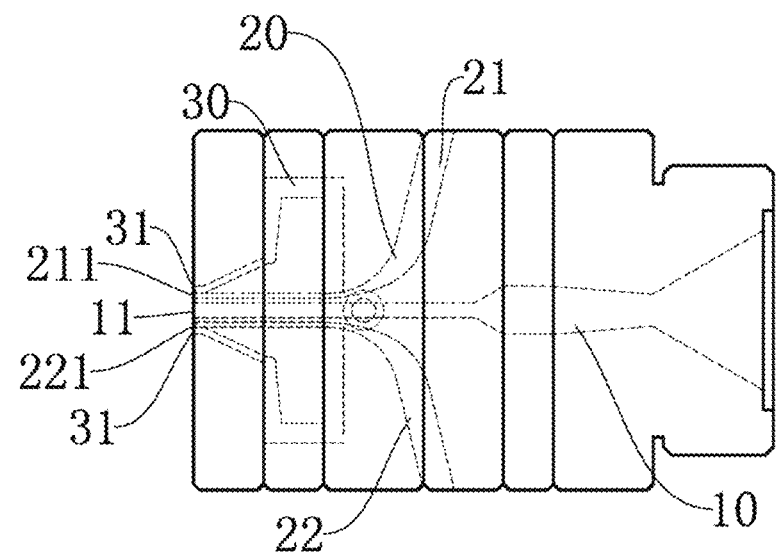
FIG. 3 is a schematic diagram illustrating the structure of the mold used to prepare the support body according to Example 1 of the present disclosure.

The mold used to prepare the above-mentioned support body, that is, the co-extrusion die, may include a main mold and a shaping mold. As shown in FIG. 3, the main mold is formed by butting a plurality of mold plates including a mold feed plate, a runner forming plate, and a mold discharge plate. The main mold is provided with the main runner 10, the shaping part runner 20 and the co-extrusion runner 30; the main runner 10, the shaping part runner 20 and the co-extrusion runner 30 are independent of one another in the main mold. The shaping part runner 20 may comprise a first channel 21 and a second channel 22 distributed on both sides of the main runner 10; the first channel 21 and the second channel 22 may be formed as a first discharge port 211 and a second discharge port 221 on both sides of a main runner discharge port 11 on the mold discharge plate. The co-extrusion runner 30 forms a surface discharge port 31 on the mold discharge plate, the surface discharge port 31 may have a rectangular ring structure and may be sleeved around the main runner discharge port 11, and the first discharge port 211 and the second discharge port 221 may be provided between the main runner discharge port 11 and the surface discharge port 31.

The above-mentioned shaping part 204 may be prepared by the following method:
S1, inputting the mesh cloth made of continuous glass threads from a sealing end of the second mold into the second mold, and then pulling them out from an outlet of the second mold to maintain the mesh cloth in a stretched state;
S2, melting and extruding the resin with an extruder, and entering the main runner of the second mold from the material inlet provided on a side of the second mold; making the molten resin meet the continuous threads in a stretched state in the main runner; then, extruding the ABS resin and the mesh cloth from the outlet of the second mold, such that the shaping part is prepared.

The mesh cloth is in a belt shape, and can be formed into a rigid sheet-like plank after being covered with ABS.

Figure 4:
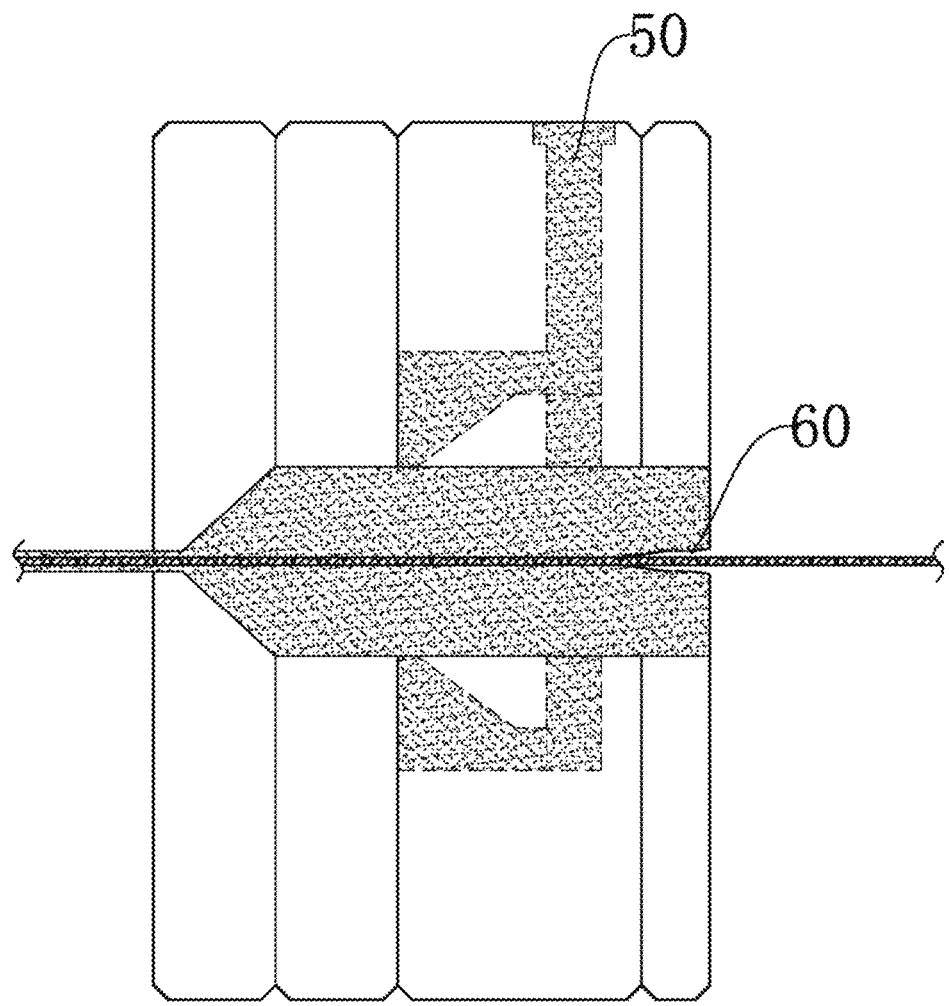
FIG. 4 is a schematic diagram illustrating the structure of the mold for preparing shaping parts according to Example 1 of the present disclosure.

The second mold, as shown in FIG. 4, one end of the main runner may be the orifice of the mold, and the orifice is flat; the other end may be sealed, and the inlet 50 of the mold may be set on the side of the mold. The sealing end of the mold may be provided with a harness part 60 that allows the mesh cloth to pass in and restricts the outflow of molten resin in the main runner. The harness part has two ends, one end is a tip end provided in the cavity of the second mold; the other end is a tail end provided on the end cap of the sealing end of the second mold. Between the tip and the tail ends is formed a thread channel allowing the mesh cloth to pass through.

Comparative Example 1 (Cmp. Exp. 1)

According to GB2445714B, a plank is prepared. The support body of the plank is rigid foamed polyurethane reinforced with fiber. The anti-slip body of the plank is polyurethane elastomer.

Comparative Example 2 (Cmp. Exp. 2)

Figure 5:
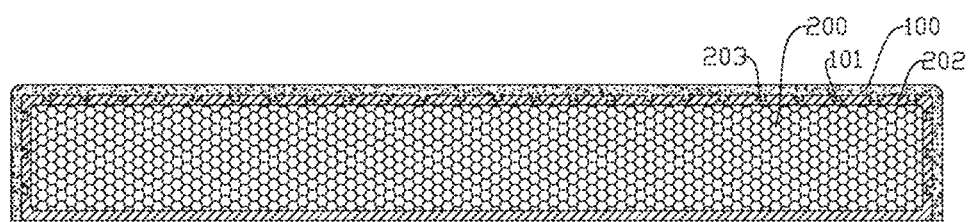
FIG. 5 is a schematic structural diagram illustrating Comparative Example 2.

As shown in FIG. 5, a thermoplastic floor with an elastic surface includes a hard support body 200 and an anti-slip body 100 clamped on the surface of the support body 200.

The anti-slip body 100 has a planar body forming the use surface of the plank, and the planar body extends toward the support body 200 to form a clamping member 101.

1), mixing 100 kg of PVC resin, 50 kg of calcium carbonate, 10 kg of acrylic regulator, 5 kg of calcium zinc stabilizer, and 1 kg of AC foaming agent in a high-speed mixer for 15 minutes, with the mixing temperature of 120° C., and then cooling in a cold mixer to 30° C.; and then inputting to the main extruder to be extruded from the main runner by the main extruder to form the core;

2), mixing 100 kg of PVC resin, 50 kg of calcium carbonate, 0.5 kg of stearic acid and 5 kg of calcium zinc stabilizer in the high-speed mixer for 15 minutes at a mixing temperature of 120° C., and then cooling in a cold mixer to 30° C., inputting to the auxiliary extruder to be extruded from the co-extrusion runner by the auxiliary extruder to cover the core, such that the support body 200 in Comparative Example 2 can be prepared.

According to the relevant content of EN 479-2018 and ISO1139-2-1999, the products of Example 1, Comparative Example 1 and Comparative Example 2 were tested, and their thermal shrinkage and linear expansion coefficients were tested. The results are shown in the following table.

| | | | Test Result | | |
|---|---|---|---|---|---|
| Test item | Test method | Test method Description | Exp. 1 | Cmp. Exp. 1 | Cmp. Exp. 2 |
| Thermal Shrinkage (%) | EN 479-2018 | Heating at 100° C. for 1 h, cooling to room temperature under 23° C. room temperature | 0.004% | — | 2.372% |
| Linear expansion coefficient (° C.$^{-1}$) | ISO1139-2-1999 | Sample length under −20° C. for 48 h; Sample length under 23° C. for 48 h; Sample length under 80° C. for 48 h | $2.66*10^{-5}$ | $2.04*10^{-5}$ | $4.35*10^{-5}$ |

The support body 200 has a plurality of clamping grooves 203 that cooperate with the clamping member 101; the clamping groove 203 has two limiting parts that restrict the clamping member from escaping from the clamping groove.

The support body 200 includes a core 201 and a reinforced shell 202 wrapped around the core 201 and not connected to it in a peelable manner; the thickness of the reinforced shell is 4.0 mm.

The core 201 is made of thermoplastic material PVC through foaming, and the anti-slip body 201 is made of elastomer material PU.

The method for preparing the above-mentioned thermoplastic floor with elastic surface includes the following steps:
a, pouring the liquid raw materials for forming the anti-slip body 100 into a mold; the liquid raw materials are formed of the following materials: 2200 g of polyether polyol, 15 g of talc, 600 g of isocyanate, and 4 g of curing agent;
b, preparing and placing the support body into the mold with the clamping groove facing downward, so that the support body floats or is suspended in the liquid raw material;
c, applying a pressure to the support body to sink in the liquid raw material, so that the liquid raw material enters the clamping groove of the support body;
d, clamping the mold and maintaining the pressure to solidify the liquid raw material.

The method for preparing the support body 200 of the Comparative Example 2 may be as follows:

After considering the specification and practicing the present disclosure disclosed herein, those skilled in the art will easily think of other embodiments of the present disclosure. the present disclosure is intended to cover any variations, uses, or adaptive changes of the present disclosure. These variations, uses, or adaptive changes follow the general principles of the present disclosure and include common knowledge or customary technical means in the technical field that are not described in the present disclosure. The description and the embodiments are only regarded as exemplary, and the true scope and spirit of the present disclosure are pointed out by the appended claims.

The invention claimed is:

1. A method for preparing a plank with anti-slip function, the plank with anti-slip function comprises a hard support body and a soft anti-slip body clipped on the support body in a releasable manner;
the anti-slip body has a planar body forming a use surface of the plank, and the planar body extends in a direction of the support body to form a clamping member;
the support body is provided with a plurality of clamping grooves that cooperate with and are able to be releasable from the clamping member; the plurality of clamping grooves are provided with at least one limiting part that restricts the clamping member from escaping from the clamping groove in a reverse direction that the clamping member extends toward the clamping groove;
the support body comprises a core and a plurality of shaping parts provided in the core to prevent the core from deforming; the core is a cubic structure with at least eight edge corners; the plurality of shaping parts are connected to at least three of the eight edge corners at the same time;

the core of the support body is made of thermoplastic material, and the anti-slip body is made of elastomer material;

comprising the following steps:

a) pouring a liquid raw material of the elastomer into a mold;

b) preparing and placing the support body into the mold with the clamping groove facing downward, so that the support body floats or is suspended in the liquid raw material;

c) applying a pressure to the support body to sink in the liquid raw material, so that the liquid raw material enters the clamping groove of the support body;

d) clamping the mold and maintaining the pressure to solidify the liquid raw material;

wherein the support body is prepared by the following steps:

1), inputting a first raw material containing a first resin and a foaming agent into a main extruder for mixing, and extruding the mixed first raw material containing the first resin and the foaming agent by the main extruder into a main runner of a co-extrusion die, to form a pressure-retaining core;

2), inputting two shaping parts with belt shape from two side runners of the co-extrusion die respectively:

3), feeding, by an auxiliary extruder, a second raw material containing a second resin from a co-extrusion runner of the co-extrusion die, and extruding from an outlet of the die to obtain a reinforced shell with a frame shape;

4), extruding the pressure-retaining core, the shaping parts and the reinforced shell from their respective runners, to form a mold blank;

5), inputting the mold blank into a shaping mold; and foaming, in the shaping mold, the pressure-retaining core in the reinforced shell constrained by inner walls of the shaping mold, to fill the reinforced shell to form a support body precursor;

6), opening the clamping grooves on at least one surface of the support body precursor;

where, the main runner, the side runners and co-extrusion runner are provided independently of one another;

the pressure-retaining core is provided in the reinforced shell, and the shaping parts with belt shape are provided between two opposite surfaces of the pressure-retaining core and the reinforced shell; and a pre-formed foaming space is provided between the pressure-retaining core and the reinforced shell.

2. The method according to claim 1, wherein the shaping part is prepared by the following steps:

S1, inputting a mesh cloth made of continuous glass threads from a sealing end of a second mold into the second mold, and then pulling them out from an outlet of the second mold to maintain the mesh cloth in a stretched state;

S2, melting and extruding a resin with an extruder, and entering a main runner of the second mold from a material inlet provided on a side of the second mold; making the resin meet the mesh cloth in the stretched state in the main runner; then, extruding the resin and the mesh cloth from a outlet of the second mold, such that the shaping part is prepared.

3. The method according to claim 1, wherein the co-extrusion die comprises a main mold and the shaping mold is installed at an outlet of the main mold;

the main mold is formed by butting a plurality of mold plates including a mold feed plate, a runner forming plate, and a mold discharge plate;

the main mold is provided with a main runner (10), a shaping part runner (20) and a co-extrusion runner (30); the main runner (10), the shaping part runner (20) and the co-extrusion runner (30) are independent of one another in the main mold;

the shaping part runner (20) comprises a first channel (21) and a second channel (22) distributed on both sides of the main runner (10); the first channel (21) and the second channel (22) are formed as a first discharge port (211) and a second discharge port (221) on both sides of a main runner discharge port (11) on the mold discharge plate;

the co-extrusion runner (30) forms a surface discharge port (31) on the mold discharge plate, the surface discharge port (31) has a rectangular ring structure and is sleeved around the main runner discharge port (11), and the first discharge port (211) and the second discharge port (221) are provided between the main runner discharge port (11) and the surface discharge port (31).

* * * * *